(12) United States Patent
Muldrow

(10) Patent No.: US 10,315,497 B2
(45) Date of Patent: Jun. 11, 2019

(54) EMERGENCY VEHICLE DOOR OPENING SYSTEM

(71) Applicant: Jasper Muldrow, E Cleveland, OH (US)

(72) Inventor: Jasper Muldrow, E Cleveland, OH (US)

( * ) Notice: Subject to any disclaimer, the term of this patent is extended or adjusted under 35 U.S.C. 154(b) by 209 days.

(21) Appl. No.: 15/635,978

(22) Filed: Jun. 28, 2017

(65) Prior Publication Data

US 2019/0001795 A1 Jan. 3, 2019

(51) Int. Cl.
*B60J 5/04* (2006.01)
*B60R 21/12* (2006.01)
*B60R 21/21* (2011.01)
*B60R 21/01* (2006.01)

(52) U.S. Cl.
CPC ............ *B60J 5/047* (2013.01); *B60J 5/0486* (2013.01); *B60R 21/12* (2013.01); *B60R 21/21* (2013.01); *B60R 2021/01211* (2013.01)

(58) Field of Classification Search
CPC ......... B60J 5/047; B60J 5/0486; B60R 21/12; B60R 21/21; B60R 21/01; B60R 2021/01211
See application file for complete search history.

(56) References Cited

U.S. PATENT DOCUMENTS

| | | | | |
|---|---|---|---|---|
| 4,703,585 A | * | 11/1987 | Koch | B60J 5/047 49/216 |
| 5,148,631 A | | 9/1992 | Bayard et al. | |
| 5,318,147 A | * | 6/1994 | Maiefski | B60R 21/12 109/32 |
| 5,493,268 A | * | 2/1996 | Lewis, Sr. | B60R 25/10 180/287 |
| 5,842,644 A | | 12/1998 | Remis et al. | |
| 5,912,615 A | | 6/1999 | Kretzmar et al. | |
| 6,860,542 B1 | * | 3/2005 | Zabtcioglu | B60J 5/047 292/144 |
| 7,178,827 B2 | | 2/2007 | Wu et al. | |
| D602,837 S | | 10/2009 | Aoki | |
| 2007/0057491 A1 | | 3/2007 | Bayley | |

FOREIGN PATENT DOCUMENTS

WO WO0108943 8/2001

* cited by examiner

*Primary Examiner* — Justin B Rephann

(57) ABSTRACT

An emergency vehicle door opening system includes a vehicle assembly with a body having an opening therein to allow passenger entry. The opening has a front edge, a rear edge, a top edge, and a bottom edge. A door is pivotally coupled to the body adjacent to the front edge and is positionable in a closed position closing the opening or in an open position exposing the opening. The door has an inner edge positioned adjacent to the front edge and an outer edge positioned opposite of the inner edge. An opening assembly is mounted on the vehicle assembly. The opening assembly is mounted on the vehicle and moves the door from an ajar position to a fully open position when the opening assembly is actuated. The outer edge of the door moves at a speed greater than 30 mph when the opening assembly moves the door.

5 Claims, 5 Drawing Sheets

EMERGENCY VEHICLE DOOR OPENING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to door opening devices and more particularly pertains to a new door opening device for allowing a person to cause their door to be violently swung open such that it may be used as a weapon against an assailant standing next to the door.

BRIEF SUMMARY OF THE INVENTION

An embodiment of the disclosure meets the needs presented above by generally comprising a vehicle assembly including a body having an opening therein to allow a passenger to enter the body. The opening has a perimeter edge including a front edge, a rear edge, a top edge, and a bottom edge. A door is pivotally coupled to the body adjacent to the front edge and is positionable in a closed position closing the opening or in an open position exposing the opening. The door has an inner edge positioned adjacent to the front edge and an outer edge positioned opposite of the inner edge. An opening assembly is mounted on the vehicle assembly. The opening assembly is mounted on the vehicle and moves the door from an ajar position to a fully open position when the opening assembly is actuated. The outer edge of the door moves at a speed greater than 30 mph when the opening assembly moves the door.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
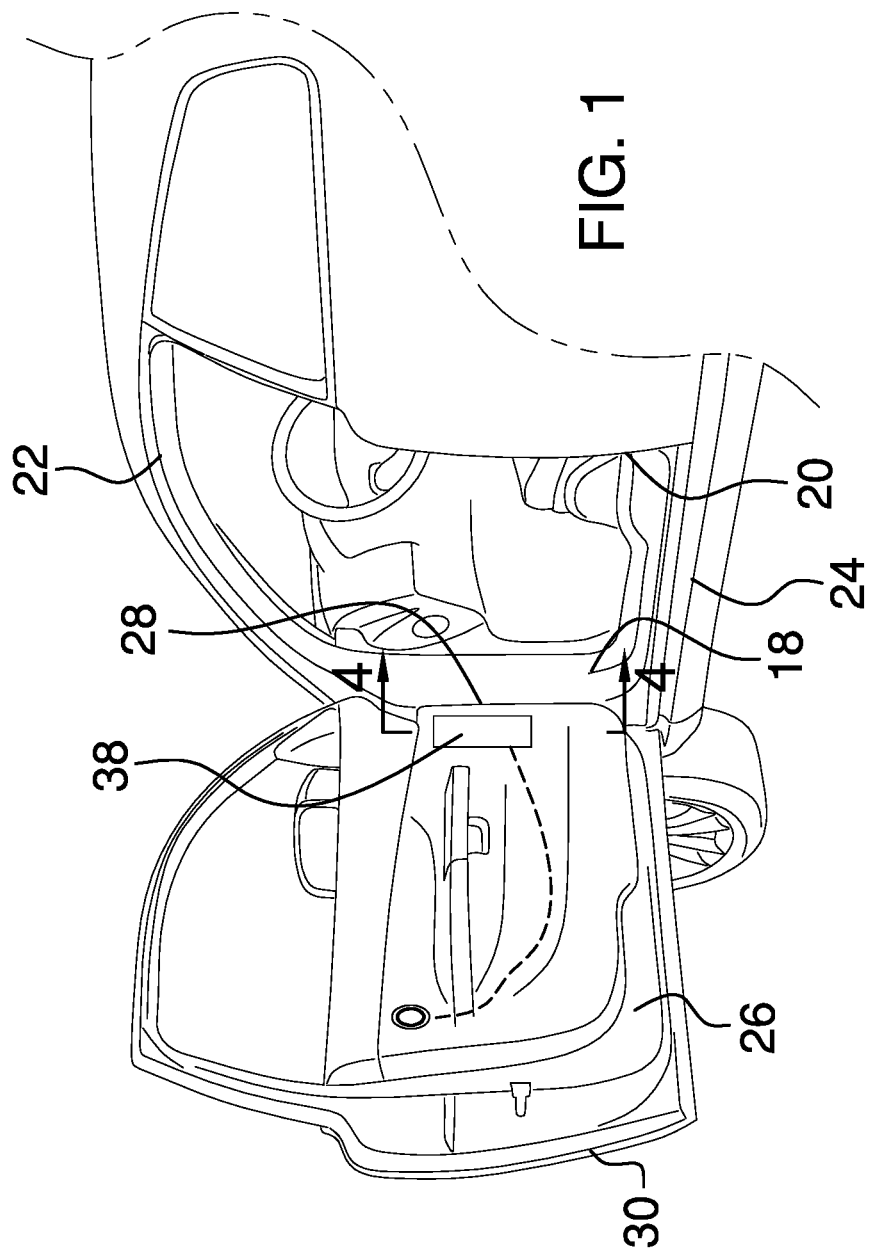
FIG. 1 is a perspective view of an emergency vehicle door opening system according to an embodiment of the disclosure.
Figure 2:
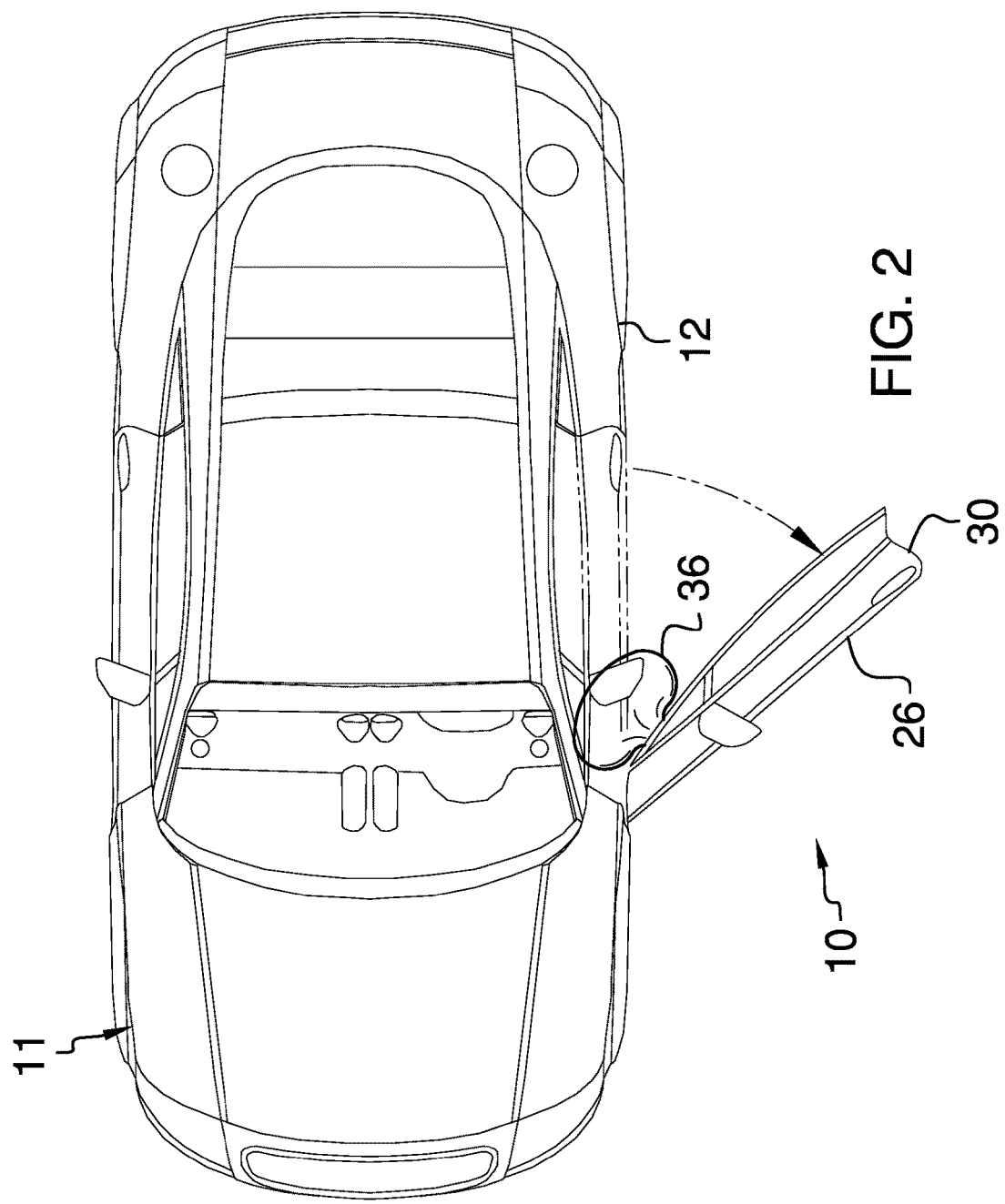
FIG. 2 is a top of an embodiment of the disclosure.
Figure 3:
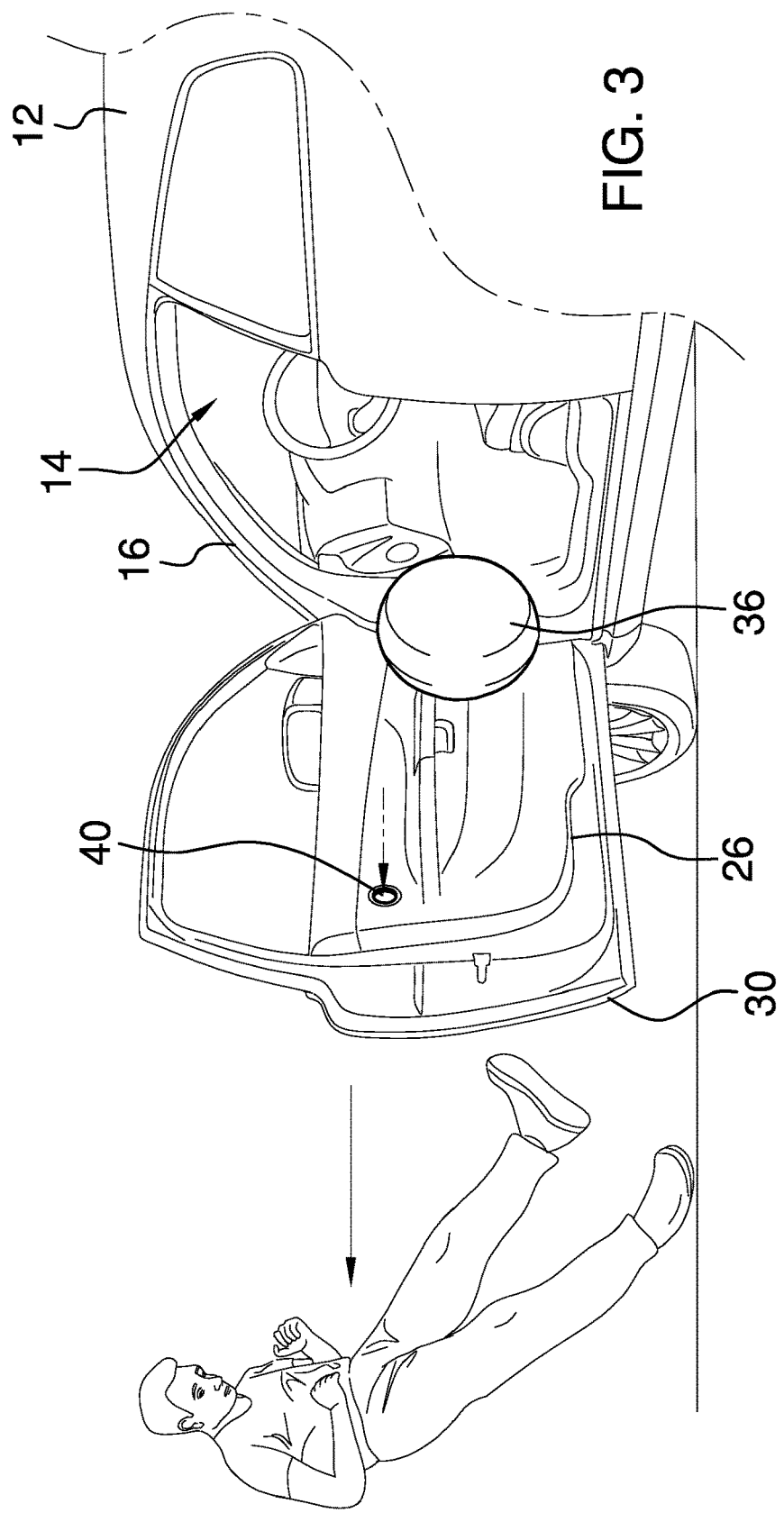
FIG. 3 is a perspective view of an embodiment of the disclosure.
Figure 4:
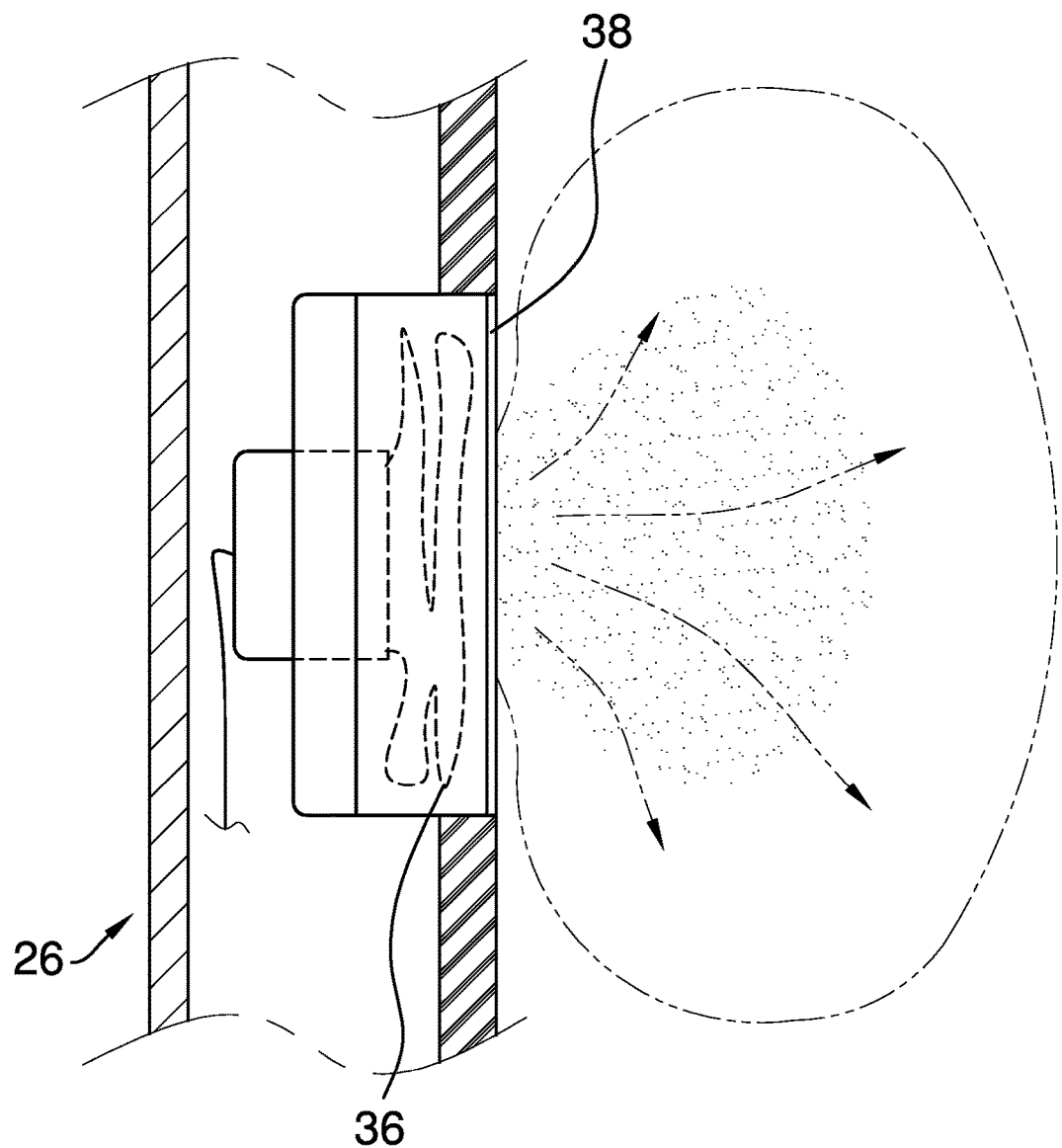
FIG. 4 is a cross-sectional view of an embodiment of the disclosure taken along line 4-4 of FIG. 1.
Figure 5:
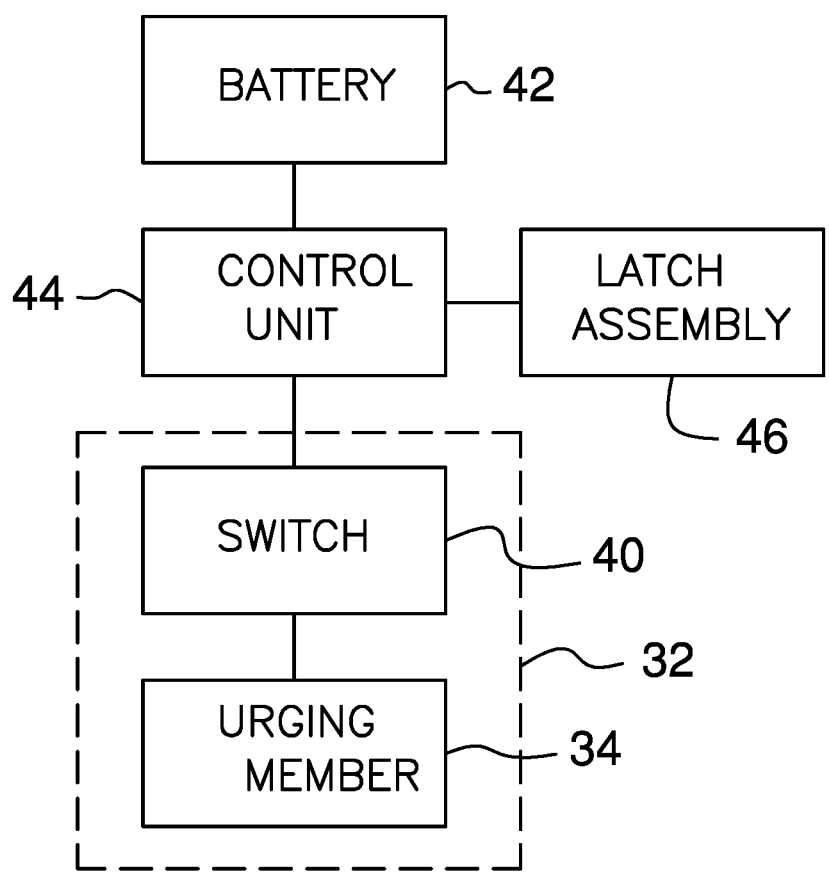
FIG. 5 is a schematic view of an embodiment of the disclosure.

With reference now to the drawings, and in particular to FIGS. 1 through 5 thereof, a new door opening device embodying the principles and concepts of an embodiment of the disclosure and generally designated by the reference numeral 10 will be described.

As best illustrated in FIGS. 1 through 5, the emergency vehicle door opening system 10 generally comprises a vehicle assembly 11 including a body 12 having an opening 14 therein to allow a passenger to enter the body 12. The opening 14 may be any opening but typically, for the entire system 10, the opening 14 will comprise the driver opening. The opening 14 has a perimeter edge 16 that includes a front edge 18, a rear edge 20, a top edge 22, and a bottom edge 24. A door 26 is pivotally coupled to the body 12 adjacent to the front edge 18 in a conventional manner, such as with hinges. The door 26 is positionable in a closed position closing the opening 14 or in an open position exposing the opening 14. The door 26 has an inner edge 28 positioned adjacent to the front edge 18 and an outer edge 30 positioned opposite of the inner edge 26.

An opening assembly 32 is mounted on the vehicle assembly 11. The opening assembly 32 is mounted on the vehicle assembly 11 and moves the door 26 from an ajar position to a fully open position when the opening assembly 32 is actuated. The term ajar is defined as the outer edge 30 being spaced from the body 12 a distance of less than at least 1.5 feet and more preferably a distance of less than 0.5 feet. Further, the term ajar indicates that the door 26 is not fully closed and latched in the closed position. The outer edge 30 of the door moves at a speed greater than 30 mph when the opening assembly 32 moves the door such that the door 26 is opened up in an extremely fast and violent manner.

The opening assembly 32 includes an urging member 34 engaging the door 26 and the body 12 when the opening assembly 32 is actuated. The urging member 34 urges the door 26 away from the body 12. The urging member 34 may be mounted on the body 12 or the door 26, but it may be beneficial to mount the urging member 34 on the door 26 such that it is positioned adjacent to the inner edge 18. The urging member 34 pushes the front edge 18 and door 26 away from each other to swing the outer edge 30 of the door 26 away from the body 12. The urging member 34 may comprise an airbag 36 that is explosively inflated when the opening assembly 32 is actuated. The airbag 36 may be positioned within the door 26 and behind a panel 38. Alternatively, the urging member 34 may comprise a pneumatically actuated rod or electric motor coupled a juncture of the door and the body. However, an airbag 36 may be preferred due to its well tested properties and ease of installation.

A switch 40 is operationally coupled to the urging member 34. The switch 40 is actuated to cause the urging member 34 to engage each of the door 26 and the body 12 to move the door 26 to the fully open position. The switch 40 may be mounted on the door 26. A power supply or battery 42 is operationally coupled to the urging member 34 and the switch 40. The power supply may comprise the battery of the vehicle assembly 11. A control unit 44 is electrically coupled to the urging member 34 and may further be electrically coupled to the vehicle assembly 11. The control unit 44 detects when the door 26 is in a closed position or an ajar position. The urging member 34 is deactivated when the control unit 44 detects the door 26 is in the closed position. Further, the control unit 44, which may comprise a CPU of the vehicle and thus be connected to a latch assembly 46 of the door 26 to indicate the open condition of the door, may be programmed such that the switch 44 must be actuated for a selected amount of time, such as 1.5 seconds to avoid accidental actuation of the opening assembly 32.

In use, the opening assembly 32 is generally to be used only in emergency situations. More particularly, the opening assembly 32 may be actuated when a would-be carjacker, thief or other assailant is adjacent to the door 26. The driver of the vehicle assembly 11 will utilize the opening assembly 32 to cause the door 26 to strike the assailant such that they are thrown away from the vehicle assembly 11.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A door opening system for opening a vehicle door during an emergency, said system comprising:
    a vehicle assembly including:
        a body having an opening therein to allow a passenger to enter said body, said opening having a perimeter edge including a front edge, a rear edge, a top edge, and a bottom edge;
        a door being pivotally coupled to said body adjacent to said front edge, said door being positionable in a closed position closing said opening or in an open position exposing said opening, said door having an inner edge positioned adjacent to said front edge and an outer edge positioned opposite of said inner edge;
    an opening assembly being mounted on said vehicle assembly, said opening assembly being mounted on said vehicle and moving said door from an ajar position being open less than 0.5 feet to a fully open position when said opening assembly is actuated, said outer edge of said door moving at a speed greater than 30 mph when said opening assembly moves said door.

2. The door opening system according to claim 1, wherein said opening assembly includes:
    an urging member engaging said door and said body when said opening assembly is actuated, said urging member urging said door away from said body; and
    a switch being operationally coupled to said urging member, said switch being actuated to cause said urging member to engage each of said door and said body to move said door to said fully open position.

3. The door opening system according to claim 2, wherein said urging member is mounted in said door and being positioned adjacent to said inner edge, said urging member comprising an airbag being explosively inflated when said opening assembly is actuated.

4. The door opening system according to claim 2, further including:
    a power supply being operationally coupled to said urging member and said switch;
    a control unit being electrically coupled to said urging member, said control unit being electrically coupled to said vehicle assembly, said control unit detecting when said door is in said closed position or said ajar position, said switch urging member being deactivated when said control unit detects said door being in said closed position.

5. A door opening system for opening a vehicle door during an emergency, said system comprising:
    a vehicle assembly including:
        a body having an opening therein to allow a passenger to enter said body, said opening having a perimeter edge including a front edge, a rear edge, a top edge, and a bottom edge;
        a door being pivotally coupled to said body adjacent to said front edge, said door being positionable in a closed position closing said opening or in an open position exposing said opening, said door having an inner edge positioned adjacent to said front edge and an outer edge positioned opposite of said inner edge;
    an opening assembly being mounted on said vehicle assembly, said opening assembly being mounted on said vehicle and moving said door from an ajar position being open less than 0.5 feet to a fully open position when said opening assembly is actuated, said outer edge of said door moving at a speed greater than 30 mph when said opening assembly moves said door, said opening assembly including:
        an urging member engaging said door and said body when said opening assembly is actuated, said urging member urging said door away from said body, said urging member being mounted in said door and being positioned adjacent to said inner edge, said urging member comprising an airbag being explosively inflated when said opening assembly is actuated, said airbag being within said door and behind a panel;
a switch being operationally coupled to said urging member, said switch being actuated to cause said urging member to engage each of said door and said body to move said door to said fully open position;
a power supply being operationally coupled to said urging member and said switch;
a control unit being electrically coupled to said urging member, said control unit being electrically coupled to said vehicle assembly, said control unit detecting when said door is in said closed position or said ajar position, said urging member being deactivated when said control unit detects said door being in said closed position.

\* \* \* \* \*